United States Patent
Breese

(10) Patent No.: US 6,792,660 B1
(45) Date of Patent: Sep. 21, 2004

(54) METHOD FOR MANUFACTURING A DRIVESHAFT ASSEMBLY THAT IS BALANCED FOR ROTATION

(75) Inventor: Douglas E. Breese, Walbridge, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/334,039

(22) Filed: Dec. 30, 2002

(51) Int. Cl.$^7$ ............................................... B23Q 17/00
(52) U.S. Cl. .................. 29/407.05; 29/425; 29/443; 29/901; 464/180; 464/182; 464/183
(58) Field of Search .................. 29/407.05, 889.61, 29/890.53, 892.2, 425, 443, 445, 455.1, 466, 506, 511, 519, 520, 521, 527.1, 527.7, 901, 888.08, 888.1; 464/180, 182, 183

(56) References Cited

U.S. PATENT DOCUMENTS

| | | | |
|---|---|---|---|
| 4,380,443 A | * | 4/1983 | Federmann et al. ........ 464/181 |
| 4,614,506 A | * | 9/1986 | Sakata ........................ 464/162 |
| 4,738,020 A | * | 4/1988 | Neuenschwander .......... 29/598 |
| 4,792,320 A | * | 12/1988 | Nickel ........................ 464/181 |
| 4,868,762 A | | 9/1989 | Grim et al. |
| 4,887,989 A | * | 12/1989 | Kerecman .................... 464/180 |
| 4,895,551 A | * | 1/1990 | Fritz ............................ 464/180 |
| 5,222,915 A | * | 6/1993 | Petrzelka et al. ........... 464/181 |
| 5,234,378 A | * | 8/1993 | Helgesen et al. ........... 464/180 |
| 5,692,959 A | * | 12/1997 | Schabel ....................... 464/134 |

* cited by examiner

Primary Examiner—David P. Bryant
Assistant Examiner—Stephen Kenny
(74) Attorney, Agent, or Firm—MacMillan, Sobanski & Todd, LLC

(57) ABSTRACT

A method for manufacturing a driveshaft assembly takes advantage of the asymmetrical nature of the driveshaft tube and end fittings to reduce the initial imbalance of the driveshaft assembly. The method includes the initial steps of providing a driveshaft tube having a heavy side and providing an end fitting having a heavy side. The heavy side of the end fitting is aligned so as to be opposite the heavy side of the driveshaft tube. Finally, the driveshaft tube and the end fitting are secured together. The dimensional characteristics of the driveshaft tube and end fitting improve the balancing capability of the driveshaft assembly by permitting levels of imbalance of the driveshaft assembly to be lowered and better-managed.

20 Claims, 4 Drawing Sheets

METHOD FOR MANUFACTURING A DRIVESHAFT ASSEMBLY THAT IS BALANCED FOR ROTATION

BACKGROUND OF THE INVENTION

This invention relates in general to driveshaft assemblies, such as are commonly used in vehicle drive train systems for transmitting rotational force or torque from an engine/transmission to an axle assembly. In particular, this invention relates to an improved method for manufacturing a driveshaft assembly that is balanced for rotation during use.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. A typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. Similarly, the end fittings would also be manufactured in such a manner as to be precisely balanced for rotation. Such perfectly shaped end fittings could be secured to the driveshaft tube without affecting the rotational balance characteristics thereof. In actual practice, however, the driveshaft tube and the end fittings usually contain variations in roundness, straightness, wall thickness, and shape that result in minor individual imbalances when rotated at high speeds. As a result, when the end fittings are secured to the driveshaft tube, the combined driveshaft assembly is usually rotationally imbalanced.

To prevent such imbalances from generating undesirable noise or vibration when rotated during use, it is commonplace to counteract such imbalances by securing balance weights to selected portions of the driveshaft assembly. The balance weights are sized and positioned to counterbalance the imbalances of the driveshaft assembly such that it is balanced for rotation during use. Traditionally, the balancing process has been performed through the use of a conventional balancing machine. The balancing machine includes a pair of fittings that are adapted to support the ends of the driveshaft assembly thereon. The balancing machine further includes a motor for rotating the driveshaft assembly at a predetermined speed. As the driveshaft assembly is rotated, the balancing machine senses vibrations that are caused by imbalances in the structure of the driveshaft assembly. The balancing machine is responsive to such vibrations for determining the size and location of one or more balance weights that, if secured to the driveshaft assembly, will minimize these imbalances. The rotation of the driveshaft assembly is then stopped to allow such balance weights to be secured to the driveshaft assembly in a conventional manner, such as by welding, adhesives, and the like. The driveshaft assembly is again rotated to confirm whether proper balance has been achieved or to determine if additional balance weights are required.

Although this method has been effective, this balancing process has been found to be relatively slow and inefficient. This is because each driveshaft tube must usually be rotated and measured at least two times, a first time to measure the imbalances and determine the size and location of the balance weights, and a second time to confirm that proper balance has been achieved after the balance weights have been secured thereto. This time consuming process is particularly problematic in the context of balancing vehicular driveshaft tubes, which are typically manufactured in relatively large volumes. Thus, it would be desirable to provide an improved apparatus and method for quickly and efficiently balancing an article, such a tube for use in a vehicular driveshaft assembly, for rotation about an axis.

Conventional end fittings are typically formed by a forging process. In the forging process, a slug of raw material, usually aluminum, is inserted into the cavity of a die. The cavity defines the general shape of the end fitting. A punch applies a compressive force against the slug to cause the slug to assume the shape of the cavity. As a result of the forging process, an asymmetrical raw part is formed. The raw part is machined to form the end fitting. The end fittings are welded to each end of the driveshaft tube to form the driveshaft assembly. After manufacture, the driveshaft assembly must be precisely balanced for rotation to prevent undesirable noise and vibration. This is typically accomplished by determining the amount and location of imbalance of the driveshaft assembly and securing an appropriate counter weight to the driveshaft assembly to offset such imbalance. By convention, the manufacturing and the balancing of the driveshaft assembly have been performed as two separate and unrelated operations. That is to say, the driveshaft assembly has been completely manufactured and then balanced. This can result in a driveshaft assembly that is greatly imbalanced if the heavy side of one or both of the end fittings is aligned with the heavy side of the driveshaft tube.

SUMMARY OF THE INVENTION

This invention relates to an improved method for manufacturing a driveshaft assembly that takes advantage of the asymmetrical nature of the driveshaft tube and the end fittings to reduce the imbalance of the driveshaft assembly. The method comprises the initial steps of providing a driveshaft tube having a heavy side and providing an end fitting having a heavy side. The heavy side of the end fitting is aligned so as to be opposite the heavy side of the driveshaft tube. Finally, the driveshaft tube and the end fitting are secured together. The dimensional characteristics of the driveshaft tube and end fitting improve the balancing capability of the driveshaft assembly by permitting levels of imbalance of the driveshaft assembly to be lowered and better-managed.

Various objects and advantages of this invention will become apparent to those skilled in the art from the follow-

DETAILED DESCRIPTION OF THE PREFERRED EMBODIMENT

Figure 1:
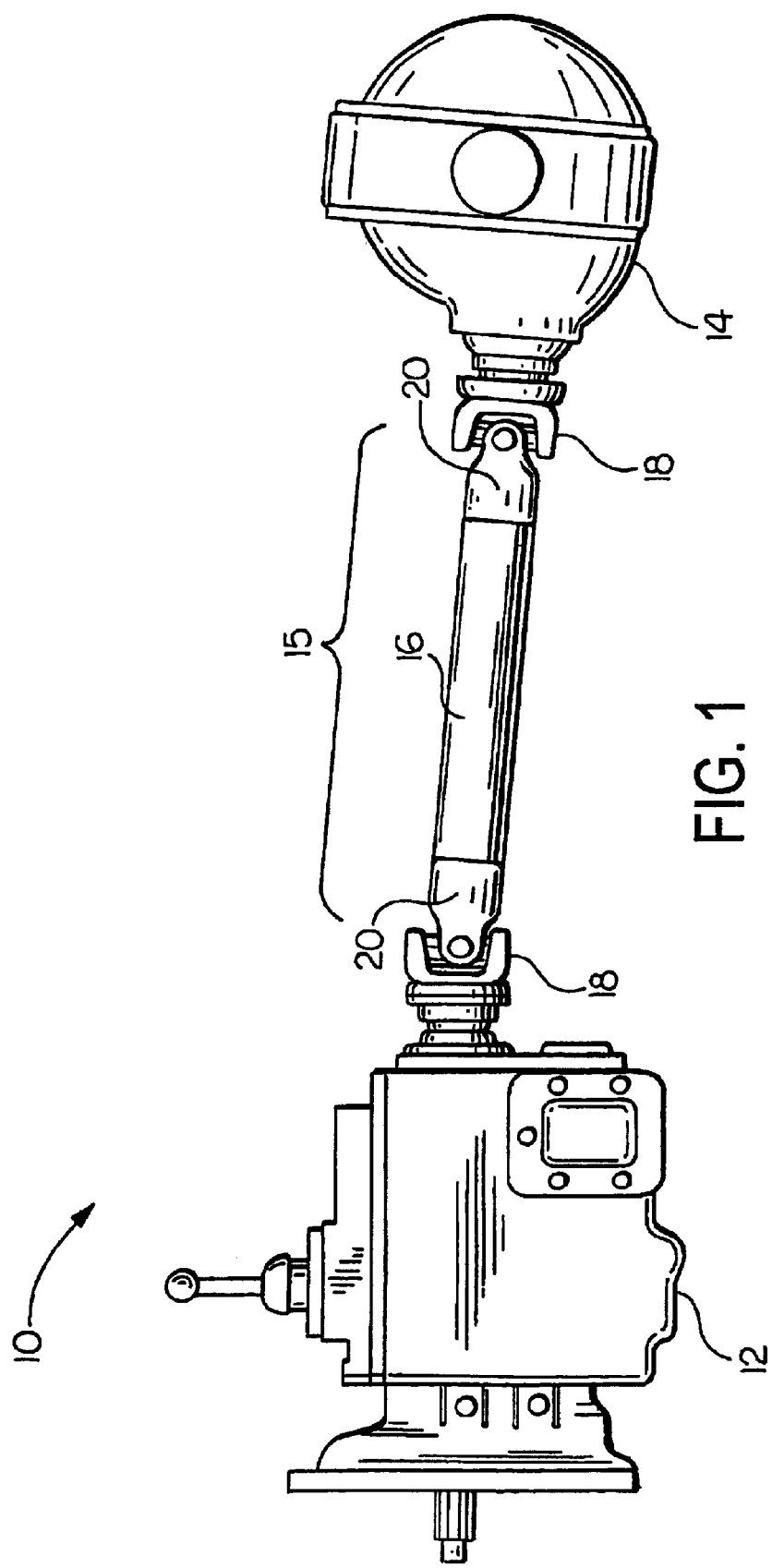
FIG. 1 is a schematic side elevational view of a vehicle drive train system including a driveshaft assembly in accordance with this invention.

Referring now to the drawings, there is illustrated in FIG. 1 a drive train system, indicated generally at 10, in accordance with this invention. The illustrated drive train system 10, which is intended to be representative of any drive train system (vehicular or otherwise) for transferring rotational power from a source to a driven device, includes a transmission 12 having an output shaft (not shown) that is connected to an input shaft (not shown) of an axle assembly 14 by a driveshaft assembly 15. The transmission 12 and the axle assembly 14 are conventional in the art. The driveshaft assembly 15 includes a hollow cylindrical driveshaft tube 16 that extends from a front end adjacent to the transmission 12 to a rear end adjacent to the axle assembly 14. The driveshaft assembly 15 further includes a pair of universal joints 18 for rotatably connecting the output shaft of the transmission 12 to the front end of the driveshaft assembly 15 and for rotatably connecting the rear end of the driveshaft assembly 15 to the input shaft of the axle assembly 14. The universal joints 18 are also conventional in the art. An end fitting 20, commonly referred to as a tube yoke or slip yoke, is provided at the front end of the driveshaft tube 16 for connecting the front end of the driveshaft tube 16 to the front universal joint 18. An end fitting 20 is also provided at the rear end of the driveshaft tube 16 for connecting the rear end of the driveshaft tube 16 to the rear universal joint 18. The end fitting 20 is conventional in the art and can be secured to the ends of the driveshaft tube 16 by welding, adhesives, or other relatively permanent securing means.

Figure 2:
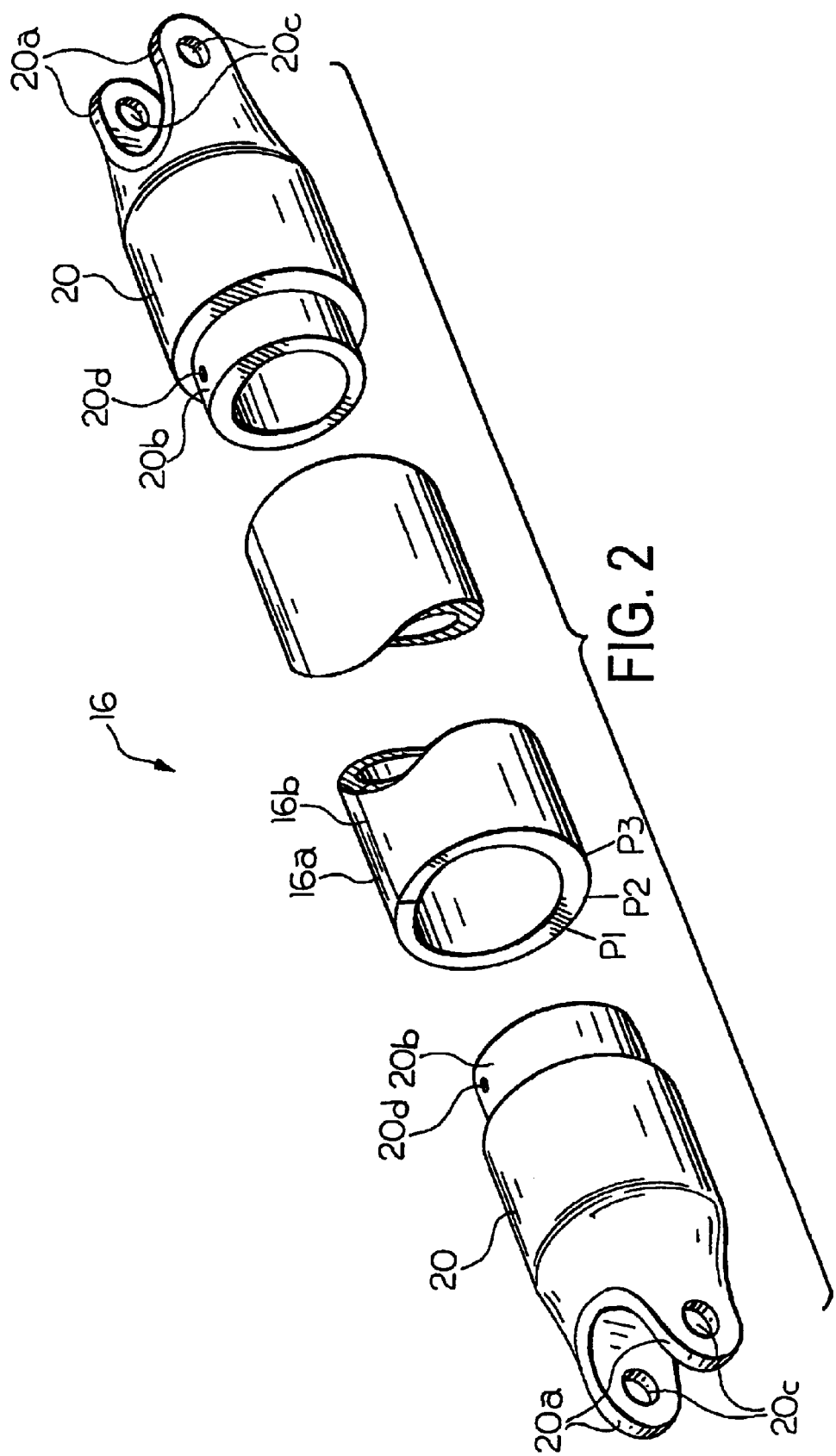
FIG. 2 is an enlarged, partially exploded perspective view of the driveshaft assembly illustrated in FIG. 1.

The driveshaft tube 16 may be formed from any suitable material, such as aluminum or steel, and in accordance with any suitable method, such as by a machining method or an extrusion method. However, in a preferred embodiment of the invention, the driveshaft tube 16 is formed from rolled tubing 16a, as shown in FIG. 2. The rolled tubing 16a is most preferably aluminum. The rolled tubing 16a has a seam 16b that extends longitudinally from the front end of the driveshaft tube 16 to the rear end of the driveshaft tube 16. The seam 16b is formed or joined using a conventional welding method, such as a high-frequency resistance welding, laser welding, or metal inert gas (MIG) welding, or any other technique that is suited for forming the seam 16b.

The end fitting 20 may be formed from any material, such as aluminum or steel, and in accordance with any suitable method, such as by a machining or casting. However, in the preferred embodiment of the invention, the end fitting 20 is forged. In the forging process, a raw material, commonly referred to as a slug (not shown), is provided in a cavity of a metal die (not shown). The cavity is in the general shape of the outside geometry of the end fitting 20. The slug is most preferably aluminum. A punch (not shown) applies a compressive force against the slug to cause the slug to come into contact with the cavity and thus assume the shape of the cavity. As a consequence, a raw part is formed. The raw part is in the general shape of the end fitting 20, including the lugs 20a and the tube seat 20b. Holes 20c are drilled and broached so as to permit smooth unencumbered insertion of the universal joints 18 therein, the outer surface of the lugs 20a are faced so that the universal joint 18 can be axially centered between the lugs 20a, and the tube seat 20b is turned down so as to fit snugly within the open ends of the driveshaft tube 16.

Regardless of the method of formation, the driveshaft tube 16 and the end fittings 20 are likely circumferentially asymmetric and thus imbalanced. In the preferred embodiment of the invention, the distribution of mass of the driveshaft tube 16 is of a nature that the amount of mass is greater circumferentially opposite the seam 16b than the mass at the seam 16b. That is to say, the heavier side of the rolled tubing 16a of the driveshaft tube 16 is opposite the welded seam 16b. This is because the thickness of the wall of the driveshaft tube 16 is greater opposite the seam 16b. This is exaggerated for illustrative purposes in FIG. 2. As shown in the drawings, the thickness of the wall of the rolled tubing 16a increases gradually starting at a point P1 at about 150 degrees from the welded seam 16b to the thickest point P2 at about 180 degrees from the seam 16b and then decreases back down to a point P3 at about 210 degrees from the seam 16b. As a consequence, the amount of mass of any portion of the driveshaft tube 16, when formed from the rolled tubing 16a, can be determined based on the circumferential distance of that portion from the seam 16b. The distribution of mass of the driveshaft tube 16 when formed of the rolled tubing 16a is usually consistent and predictable.

The predictability of the distribution of mass may not hold true for the forged end fitting 20. Each end fitting 20 has a wall thickness variation circumferentially around the perimeter of the tube seat 20b. Much of this variation can be attributed to pressures used when forging the raw part. These pressures cause the die and punch to move as the raw part is forged. Consequently, the distribution of mass of each end fitting 20 may be inconsistent and unpredictable. As a result, the distribution of mass of each end fitting 20 has to be measured and the end fitting 20 marked accordingly to indicate the distribution of mass. In accordance with a conventional method, the end fitting 20 can be placed on a gauge, such as a balancing device (not shown) or a mechanical measuring device (not shown). The balancing device senses the heavy side of the end fitting 20. The mechanical measuring device measures the variation in wall thickness of the end fitting 20. Each device correspondingly marks the end fitting 20 so that the heavy side of the end fitting 20 or the side of the end fitting 20 with the thickest wall, which corresponds to the heavy side, can be identified. Even though the distribution of mass of the end fitting 20 is likely to be unpredictable, it is possible that when the end fittings 20 are produced in a repeatable forging operation, the heavy side of the end fittings will be consistently located at a particular circumferential location on the end fittings 20. In such a case, this predictability can be used to eliminate the need for measuring the mass distribution of the end fittings prior to assembly of the driveshaft assembly 15.

Figure 4:
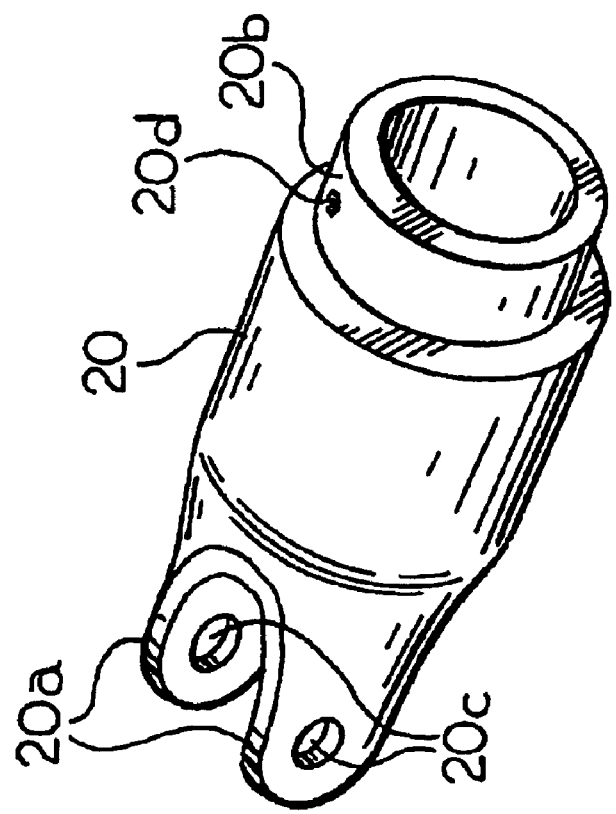
FIG. 4 is a partial perspective view of the end fitting illustrated in FIGS. 1 and 2.
Figure 3:
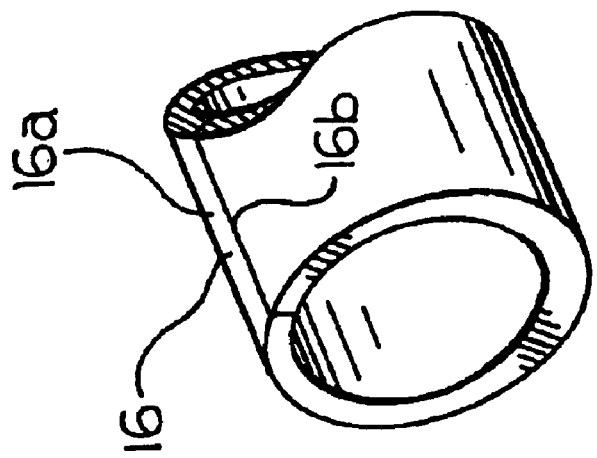
FIG. 3 is a partial perspective view of a rolled tubing that can be used to form the driveshaft tube illustrated in FIGS. 1 and 2.
Figure 5:
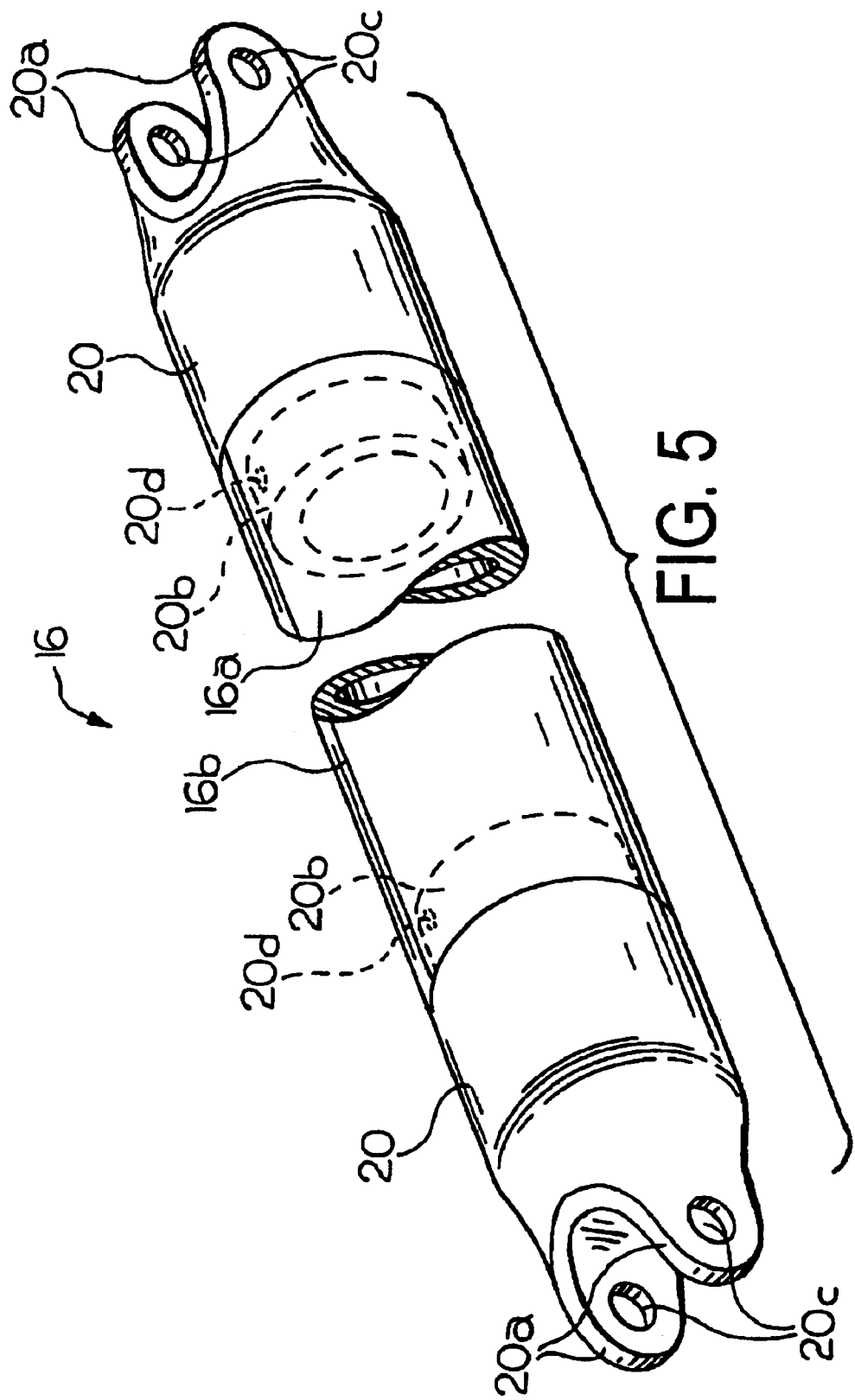
FIG. 5 is an enlarged perspective view of the driveshaft assembly illustrated in FIGS. 1 and 2.

Referring now to FIGS. 3 through 5, there is illustrated the steps in the method of this invention for forming the driveshaft assembly 15 illustrated in FIGS. 1 and 2. Initially, a driveshaft tube 16 is provided, as shown in FIG. 3. The distribution of mass of the driveshaft tube 16 must be determined. As stated above, the heavy side of the driveshaft tube 16 when formed from the rolled tubing 16a is consistently and predictably opposite the seam 16b. Hence, no additional step is required for determining the distribution of mass of the driveshaft tube 16 when formed from the rolled tubing 16a. However, the distribution of mass of other driveshafts, such as extruded driveshafts (not shown), is generally inconsistent and unpredictable. Hence, the distribution of mass for such other driveshaft tubes must be determined. This can be accomplished by measuring the distribution of mass of the driveshaft tube and marking the driveshaft tube so that the heavy side of the driveshaft tube can be identified. In accordance with a conventional method, these other driveshaft tubes can be placed on a gauge, such as a balancing device or a mechanical measuring device (not shown), which senses and marks the heavy side of the driveshaft tubes.

Next, an end fitting 20 is provided, as shown in FIG. 4. As stated above, the distribution of mass of each end fitting 20 must be determined independently. As stated above, this can be accomplished by placing the end fitting 20 on a gauge that senses the heavy side of the end fitting 20 or that measures the variation in the wall thickness of the tube seat 20b of the end fitting 20. The heavy side of the end fitting 20 corresponds with the side of the tube seat 20b having the greatest wall thickness. This is exaggerated for illustrative purposes in FIG. 4.

Next, the tube seat 20b of one of the end fittings 20 is inserted into the front end of the driveshaft tube 16 so that the heavy side of the end fitting 20 (indicated by the mark 20d on the tube seat 20b of the end fitting 20) is aligned with the light side of the driveshaft tube 16, or with the seam 16b of the driveshaft tube 16, or opposite the heavy side of the driveshaft tube 16, which is opposite the seam 16b, as shown in FIG. 5. The tube seat 20b of the other end fitting 20 can be inserted into the rear end of the driveshaft tube 16 so that its heavy side (indicated by the mark 20d on the tube seat 20b of the end fitting 20) is also aligned with the light side of the driveshaft tube 16, or with the seam 16b, or opposite the heavy side of the driveshaft tube 16, which is opposite the seam 16b. In a preferred embodiment of the invention, the outside perimeter of the tube seat 20b of each end fitting 20 is turned down during the machining of the end fitting 20 so as to produce an interference press fit between the outer perimeter of the tube seat 20b of the end fitting 20 and the inside diameter of the opening of the driveshaft tube 16. After the tube seats 20b are inserted or press fit into the front and rear ends of the driveshaft tube 16, the end fittings 20 are secured to the front and rear ends of the driveshaft tube 16. As stated above, this can be accomplished by welding, adhesives, or other relatively permanent securing means.

Finally, the driveshaft assembly 15 is balanced to reduce any remaining imbalance in the driveshaft assembly 15. This can be accomplished in any suitable manner. For example, the driveshaft assembly 15 can be balanced using a conventional dynamic balancer, which rotates the driveshaft assembly 15 at high speeds, measures the imbalance of the driveshaft assembly 15, and marks the driveshaft assembly 15 or positions the driveshaft assembly 15 so that the heavy side of the driveshaft assembly 15 can be identified. Often, the light side, or the side of the driveshaft assembly 15 opposite the heavy side, is upwardly directed or exposed. A designated amount of weight is secured to the upwardly exposed side of the driveshaft assembly 15. The dynamic balancer designates the amount of weight to be secured to the driveshaft assembly 15. The weight can be secured by welding, adhesive, or other relatively permanent securing means. This balancing step may need to be repeated one or more times to ensure that the driveshaft assembly 15 is balanced within an acceptable tolerance.

The method according to the preferred embodiment of the invention takes advantage of the consistent and predictable component characteristics of the driveshaft tube 16 to enhance the product quality of the driveshaft assembly 15. Mating the driveshaft tube 16 and end fittings 20 so that the light side of the driveshaft tube 16 aligns with the heavy side of the end fittings 20 results in a relatively counterbalanced mass distribution of the driveshaft tube 16 and the end fittings 20, and this counterbalancing partially offsets what would otherwise be a greater imbalance of the driveshaft assembly 15. This permits levels of the imbalance of the driveshaft assembly 15 to be lowered and better managed. The invention contemplates that the manufacture of the driveshaft assembly 15 be performed in such a manner as to minimize the amount of imbalance that must be addressed in a balancing operation subsequent to the assembly operation. This reduces the amount of deflection observed in the driveshaft assembly 15 at various operating speeds and thus reduces undesirable noise and vibration.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a driveshaft assembly, comprising the steps of:
   (a) providing a driveshaft tube having a heavy side;
   (b) providing an end fitting having a heavy side;
   (c) aligning the heavy side of the end fitting circumferentially opposite the heavy side of the driveshaft tube so that the heavy side of the driveshaft tube is offset by the heavy side of the end fitting; and
   (d) securing the driveshaft tube and the end fitting together.

2. The method according to claim 1 wherein the driveshaft tube is a rolled tube having a seam therein and the heavy side of the driveshaft tube is opposite the seam.

3. The method according to claim 1 further including the step of determining the distribution of mass of the driveshaft tube.

4. The method according to claim 1 further including the steps of measuring the distribution of mass of the driveshaft tube and marking the driveshaft tube so that the heavy side can be identified.

5. The method according to claim 1 further including the step of determining the distribution of mass of the end fitting.

6. The method according to claim 1 further including the steps of measuring the distribution of mass of the end fitting and marking the end fitting so that the heavy side of the end fitting can be identified.

7. The method according to claim 1 wherein the driveshaft tube and the end fitting are joined together by welding the driveshaft tube to the end fitting.

8. The method according to claim 1 further including the step of balancing the driveshaft assembly to reduce any remaining imbalance in the driveshaft assembly.

9. A method of manufacturing a driveshaft assembly, comprising the steps of:

(a) providing a driveshaft tube having an open end and a heavy side;

(b) providing a tube yoke having a tube seat, a heavy side and a circumferentially oppositely disposed light side;

(c) pressing the tube seat of the tube yoke into the open end of the driveshaft tube so that the heavy side of the driveshaft tube is aligned with the light side of the tube yoke; and (d) securing the driveshaft tube and the tube yoke together.

10. The method according to claim 9 wherein the driveshaft lube is a rolled tube having a seam therein and the heavy side of the driveshaft tube is opposite the seam.

11. The method according to claim 9 further including the step of determining the distribution of mass of the driveshaft tube.

12. The method according to claim 9 further including the step of determining the distribution of mass of the tube yoke.

13. The method according to claim 9 wherein the driveshaft tube and the tube yoke are joined together by welding the driveshaft tube to the tube yoke.

14. The method according to claim 9 further including the step of balancing the driveshaft assembly to reduce any remaining imbalance in the driveshaft assembly.

15. A method of manufacturing a driveshaft assembly, comprising the steps of:

(a) providing a driveshaft tube having a front end, a rear end, and a heavy side;

(b) providing a pair of tube yokes each having a tube seat, a heavy side, and a circumferentially oppositely disposed light side;

(c) pressing the tube seat of each of the tube yokes into a corresponding one of the front and rear ends of the driveshaft tube so that the heavy side of the driveshaft tube is aligned with the light side of each of the tube yokes; and (d) securing the driveshaft tube and the tube yokes together.

16. The method according to claim 15 wherein the driveshaft tube is a rolled tube having a seam therein and the heavy side of the driveshaft tube is opposite the seam.

17. The method according to claim 15 further including the step of determining the distribution of mass of the tube yoke.

18. The method according to claim 15 further including the steps of measuring the distribution of mass of the tube yoke and marking the tube yoke so that the heavy side of the tube yoke can be identified.

19. The method according to claim 15 wherein the driveshaft tube and the tube yoke are joined together by welding the driveshaft tube to the tube yoke.

20. The method according to claim 15 further including the step of balancing the driveshaft assembly to reduce any remaining imbalance in the driveshaft assembly.

\* \* \* \* \*

UNITED STATES PATENT AND TRADEMARK OFFICE
CERTIFICATE OF CORRECTION

PATENT NO. : 6,792,660 B1
DATED : September 21, 2004
INVENTOR(S) : Douglas E. Breese It is certified that error appears in the above-identified patent and that said Letters Patent is hereby corrected as shown below:

Column 7,
Line 13, delete the word "lube" and insert the word -- tube --.

Signed and Sealed this

Fourteenth Day of December, 2004

JON W. DUDAS
*Director of the United States Patent and Trademark Office*